Sept. 13, 1932.                G. CHIOTTI                1,876,612
                          GLASS CUTTING APPARATUS
                          Filed Sept. 24, 1929
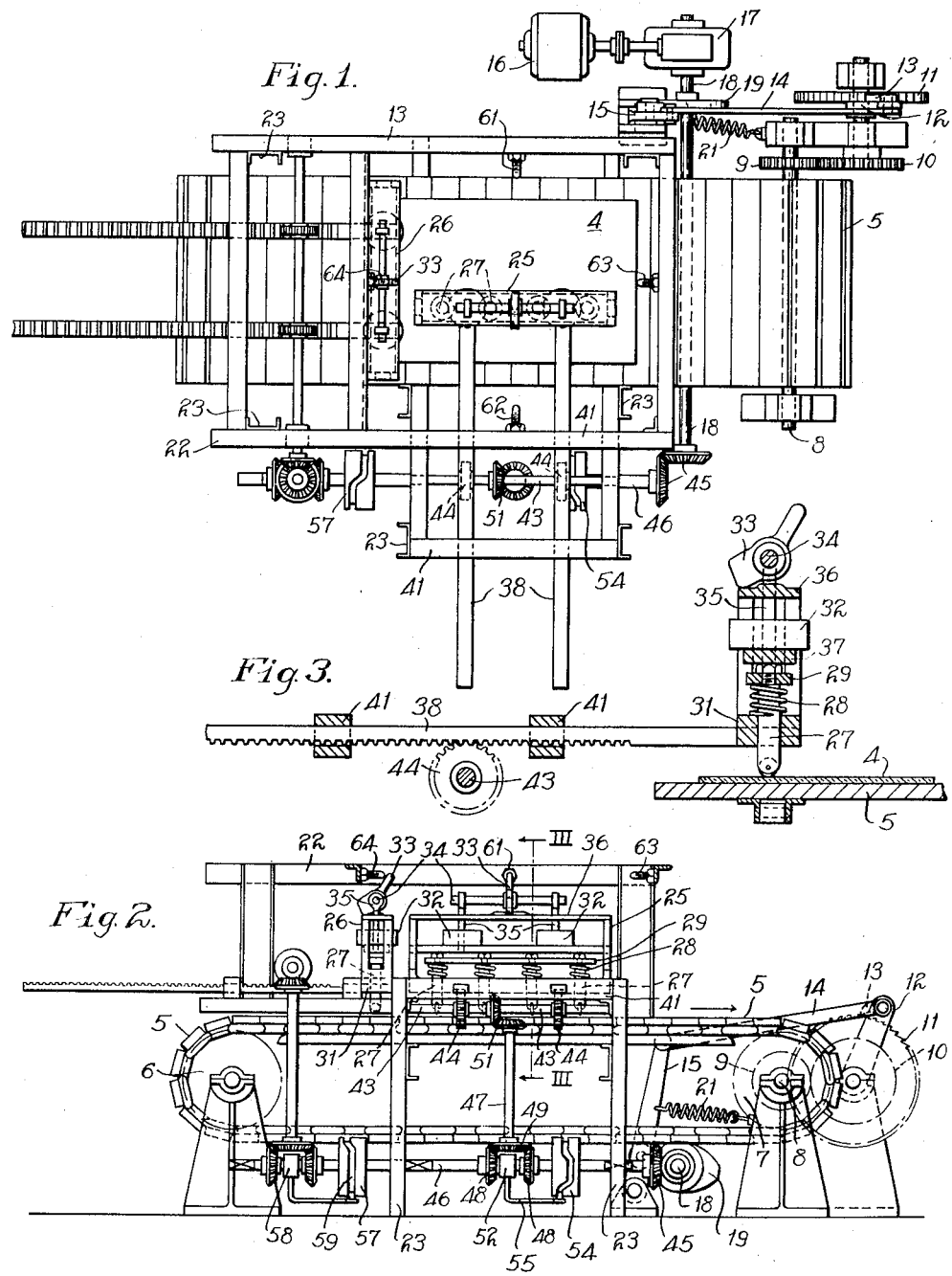
INVENTOR
Gabriele Chiotti,
By Archworth Martin,
Attorney.

Patented Sept. 13, 1932

1,876,612

UNITED STATES PATENT OFFICE

GABRIELE CHIOTTI, OF ALIQUIPPA, PENNSYLVANIA

GLASS CUTTING APPARATUS

Application filed September 24, 1929. Serial No. 394,819.

My invention relates to glass cutting apparatus, and more particularly to apparatus for cutting sheet glass.

One object of my invention is to provide apparatus that is particularly suited for cutting sheets of glass such as plate glass or window glass upon an intermittently movable table or carrier.

Another object of my invention is to provide cutting means that are movable automatically in timed relation to movement of means for advancing sheets of glass.

Still another object of my invention is to simplify and improve generally the art of glass cutting.

One means by which my invention may be practised is shown in the accompanying drawing wherein Figure 1 is a plan view of the apparatus; Fig. 2 is a side elevational view thereof, and Fig. 3 is a view, on an enlarged scale, taken on the line III—III of Fig. 2.

Sheets of glass 4 are advanced beneath the cutting elements by means of a conveyer or moving table 5 which is provided with sprocket chains that pass around sprockets 6 and 7. The sprockets 7 are secured to a shaft 8 that carries a gear wheel 9 which is driven from a gear wheel 10. The shaft of the gear wheel 10 carries a ratchet wheel 11 and pivotally supports a rocking lever 12 upon which a pawl 13 is pivotally supported.

The lever 12 is connected through a link 14 with a cam lever 15. A motor 16, through a worm gearing 17, drives a shaft 18 which carries a cam disc 19 that periodically rocks the lever 15 against the tension of a spring 21 during rotation of the shaft 18. It will be seen that the lever 12 and its pawl 13 will therefore be oscillated to intermittently advance the carrier 5 and the glass 4.

The cutting apparatus is supported upon a framework 22 that is mounted on posts 23 which are disposed to either side of the conveyer 5. A cutter head 25 is mounted for reciprocation transversely of the conveyer and a cutter head 26 for reciprocatory movement longitudinally thereof. In each cutter head a desired number of cutting tools 27 are mounted for vertical sliding movement and are normally yieldably held in upwardly projected or inoperative position by means of springs 28 that are interposed between a shoulder 29 on the upper end of each cutter stem and the carriage 31 of the cutter head. Above the cutting elements 27, I mount a weight 32 that serves to hold the cutting elements 27 in downwardly projected position against the glass, as shown in Fig. 3. When the weights 32 are lifted, the springs 28 will move the cutting elements 27 upwardly to inoperative position.

The weights 32 are supported in raised position by means of a cam lever 33 which has pivotal connection with a rod 34 that extends through the upper ends of lifting rods 35. The rods 35 extends loosely through a cross bar 36 of the carriage 31 and through the weights 32, the lower ends of the rods having flanges or nuts 37 for engaging the undersides of the weights 32 and lifting such weights when the cam lever 33 is moved in a counter-clock-wise direction from the position shown in Fig. 3.

The carriage which carries the cutter head 25 is provided with two rack bars 38 that extend through and are guided by bars 41 of the framework 22. A shaft 43 that is journaled in the framework 22 carries pinions 44 that mesh with the rack bars 38, so that when the shaft 43 is driven, the cutter head 25 will be moved across the table 5.

The shaft 43 is driven from the shaft 18 through bevel gearing 45, a shaft 46 and a shaft 47. The shaft 46 carries a pair of bevel pinions 48 that mesh with a gear wheel 49 on the lower end of the shaft 47, while the upper end of the shaft 47 has driving connection with the shaft 43 through bevel gearing 51.

The bevel gear wheels 48 are loosely mounted on the shaft 46, but are alternately connected thereto through a clutch 52 that is reciprocated longitudinally of the shaft 46 by means of a cam 54 that is secured to said shaft. The cam 54 is connected to the clutch 52 through a rod 55 whose outer end has a portion extending into the slot of the cam 54.

It is necessary that the cutter head 25 be stationary during movement of the table 5. For this reason, the cam slot has a dwell portion which maintains the clutch 52 at intermediate or inoperative position with respect to the gear wheels 48 during the time that the cam 19 is operating to advance the carrier. After the carrier has been advanced and the cam 19 is temporarily inoperative, the clutch 52 is shifted by the cam slot, to engage one of the gear wheels 48 and thus advance the cutter head 25 across the table and to then immediately shift the clutch into engagement with the other gear wheel 48 to return the cutter head.

In a similar way, the cutter head 26 is reciprocated longitudinally of the table. This reciprocatory movement is effected by means of a cam disc 57 that is secured to the shaft 46, in circumferentially offset relation with respect to the cam disc 54, the cam disc 57 serving to operate the clutch 58 as in the case of the cam disc 54 and the clutch 52 of the cutter head 25. Both the clutches 52 and 58 will be operated to advance and retract the cutter heads 25 and 26 respectively, while the cam 19 is in operative position with respect to the cam lever 15, but the circumferentially offset relation of the cams 54 and 57 permit one of the cutter heads 25—26 to be operated in advance of the other, each of the cam discs 54 and 57 having a long dwell slot 59 as shown in Fig. 2, which maintains each of the clutches in neutral position during advancing movement of the carrier and during a cycle of movement of the other clutch.

At the beginning of an advancing movement of the cutter head 25 or the cutter head 26, the cutting elements 27 of the cutting head are in downwardly projected or operative position as shown in Fig. 3 to bear against the glass sheet 4 and score the same. When the cutter head 25, for instance, is advanced across the table, the upper end of the cam lever 33 is engaged by a stop 61 that turns it backwardly from the position shown in Fig. 3, causing it to lift the weights 32 and hold them in elevated position, thus permitting the springs 28 to lift the cutting elements 27 clear of the glass.

Upon retractive movement of the cutting head 25, the upper end of the cam lever 33 is engaged by a stop 62 to effect return of such lever to the position shown in Fig. 3. In a similar manner, the cam lever 33 of the cutting head 26 is engaged by stops 63 and 64, which respectively shift such lever to shift the cutting elements to inoperative and operative positions.

It will be understood that any desired number of cutting elements 27 may be employed in each cutting head and that either of the cutting heads 25 or 26 may be eliminated, depending upon the dimensions to which it is desired to cut sheets of glass.

I claim as my invention:—

1. Apparatus for cutting sheet glass, comprising a conveyer, a cutter arranged above said conveyer for movement across a sheet of glass, a drive shaft, mechanism connected with said shaft for intermittently advancing said conveyer, means operatively connected with said shaft for moving said cutter while said conveyer is at rest, a second cutter, and means operatively connected with said shaft for moving the second-named cutter across the glass in a direction transversely of the direction of movement of the first-named cutter and in timed relation to the operation thereof.

2. Apparatus for cutting sheet glass, comprising an intermittently movable endless conveyer for advancing a sheet of glass into cutting position, a first cutter reciprocable across said glass, a second cutter reciprocable across said glass in a direction transversely of the direction of movement of the first-named cutter, a drive shaft having driving connections with said conveyer and each of said cutters, and means operatively associated with the driving connections of said conveyer and each of said cutters and driven by said drive shaft for controlling the movements of said conveyer and said cutters successively in timed relation.

3. Apparatus for cutting sheet glass, comprising a cutter head, means for advancing and retracting said head across a sheet of glass, a cutter tool carried by said head, means for yieldably holding said tool in operative position during advancing movement of the cutter head, relatively weaker means for moving the cutter tool to inoperative position, a device mounted on said cutter head for rendering the said yieldable means inoperative to permit the said weaker means to move the cutter tool to inoperative position, and a stop member positioned to be engaged by said device at a point adjacent to the end of the forward movement of the cutter head.

4. In apparatus for cutting sheet glass, the combination with a conveyer for conveying sheets of glass, of a drive shaft and mechanism operatively connected therewith for intermittently advancing the conveyer, a cutter movable across a sheet of glass, a clutch controlled reversible driving connection between said cutter and said shaft, cam means driven by said shaft for actuating said clutch, to effect a forward and backward movement of said cutter, a second cutter arranged for movement across the sheet of glass in a direction at right angles to the movement of the first-named cutter, a clutch controlled reversible driving connection between the second cutter and the shaft, and cam means driven by said shaft for actuating the clutch of the second-named driving connection upon completion of movement of the first-named cutter to effect a forward and backward movement of the second-named cutter.

In testimony whereof I, the said GABRIELE CHIOTTI, have hereunto set my hand.

GABRIELE CHIOTTI.